(12) United States Patent
Ruan et al.

(10) Patent No.: US 9,970,464 B1
(45) Date of Patent: May 15, 2018

(54) PRE-TENSIONING-PRE-TWISTING FULL-BRIDGE 2D ELECTRO-HYDRAULIC PROPORTIONAL DIRECTIONAL VALVE

(71) Applicant: Zhejiang University of Technology, Zhejiang (CN)

(72) Inventors: Jian Ruan, Zhejiang (CN); Wei Li, Zhejiang (CN); Bin Meng, Zhejiang (CN); Qiang Zuo, Zhejiang (CN); Ying Chen, Zhejiang (CN)

(73) Assignee: ZHEJIANG UNIVERSITY OF TECHNOLOGY, Hangzhou, Zhejiang (CN)

( * ) Notice: Subject to any disclaimer, the term of this patent is extended or adjusted under 35 U.S.C. 154(b) by 238 days.

(21) Appl. No.: 14/781,454

(22) PCT Filed: Oct. 31, 2013

(86) PCT No.: PCT/CN2013/086319
§ 371 (c)(1),
(2) Date: Feb. 16, 2016

(87) PCT Pub. No.: WO2014/173102
PCT Pub. Date: Oct. 30, 2014

(30) Foreign Application Priority Data

Apr. 27, 2013 (CN) .......................... 2013 1 0156704
Oct. 21, 2013 (CN) .......................... 2013 1 0497667

(51) Int. Cl.
*F16K 11/07* (2006.01)
*F16K 31/524* (2006.01)
*F15B 13/043* (2006.01)

(52) U.S. Cl.
CPC .......... *F15B 13/0433* (2013.01); *F16K 11/07* (2013.01); *F16K 31/52483* (2013.01);
(Continued)

(58) Field of Classification Search
CPC .......... F15B 13/0433; F16K 31/52483; F16K 11/0716; Y10T 137/86694; Y10T 137/86702; Y10T 137/8671
(Continued)

(56) References Cited

U.S. PATENT DOCUMENTS 6,585,004 B1    7/2003   Porter

FOREIGN PATENT DOCUMENTS

CN    201288712 Y    8/2009
CN    101666341 A    3/2010
(Continued)

OTHER PUBLICATIONS

Translation of CN102650305.*
International Search Report in International Application No. PCT/CN2013/086319, filed Oct. 31, 2013.

*Primary Examiner* — John K Fristoe, Jr.
*Assistant Examiner* — Kelsey Cary
(74) *Attorney, Agent, or Firm* — Saliwanchik, Lloyd & Eisenschenk (57) ABSTRACT

A pre-tensioning-pre-twisting full-bridge 2D electro-hydraulic proportional directional valve can include a 2D valve, linear electro-mechanical converters at two ends of the 2D valve, and a compression-torsion coupling between the linear electro-mechanical converters. The 2D valve can include a valve core and a valve body, wherein the valve core is rotatably and axially slidably disposed inside an inner hole that is set along the axis line of the valve body. Each end shoulder of the valve core is provided with a pair of high pressure holes and low pressure holes, which are respectively communicated with a P opening and a T opening through an inner hole of the valve core.

6 Claims, 5 Drawing Sheets

(52) U.S. Cl.
CPC ..... *F16K 11/0716* (2013.01); *Y10T 137/8671* (2015.04); *Y10T 137/86694* (2015.04); *Y10T 137/86702* (2015.04)

(58) Field of Classification Search
USPC .......................... 137/625.67, 625.68, 625.69
See application file for complete search history.

(56) References Cited

FOREIGN PATENT DOCUMENTS

| | | | |
|---|---|---|---|
| CN | 101737371 A | | 6/2010 |
| CN | 102650305 A | * | 8/2012 |
| CN | 102913496 A | | 2/2013 |
| CN | 103256401 A | | 8/2013 |
| CN | 103277531 A | | 9/2013 |

* cited by examiner

PRE-TENSIONING-PRE-TWISTING FULL-BRIDGE 2D ELECTRO-HYDRAULIC PROPORTIONAL DIRECTIONAL VALVE

FIELD OF THE INVENTION

The present invention relates to an electro-hydraulic proportional valve in the field of fluid transmission and control, and more particularly, to an electro-hydraulic proportional directional valve.

BACKGROUND OF THE INVENTION

An electro-hydraulic servo control technology dynamically integrates advantages of a fluid transmission and control technology and an information electronic technology, is applied to important national strategic military industrial fields such as aerospace, sophisticated weapons, steels, power generation or the like, and achieve success rapidly. However, an electro-hydraulic servo valve also has disadvantages of poor anti-pollution capacity, large loss of pressure (7 MPa) in the valve, high manufacturing cost and maintenance cost, and large system energy consumption loss, etc. Because of many disadvantages of the electro-hydraulic servo valve, its quick response performance is unable to be widely used in general industrial equipment. However, a conventional electro-hydraulic switch control is unable to satisfy requirements, in modern industrial production, for a high quality control system. Therefore, it is expected an electro-hydraulic control technology which is low in production and maintenance cost, safe and reliable, and which can satisfy actual demands for an industrial control system in control precision and response characteristic.

Based on the above reasons, an electric-hydraulic proportional technology is put forward. As a representative of the electro-hydraulic proportional technology, an electro-hydraulic proportional valve uses, on a basis of a hydraulic valve used in traditional industry, an reliable and inexpensive electro-mechanical converter (a proportional electromagnet or the like) and a corresponding valve to perform a design, thereby obtaining a proportional control element which is the same as a general industrial valve in requirements for oil quality, small in loss of pressure in the valve, and able to satisfy, in performance, most industrial control requirement.

The electro-hydraulic proportional valve can be combined with an electronic control unit, for conveniently calculating and processing various input and output signals, so as to implement complex control functions. In addition, the electro-hydraulic proportional valve has the advantages of high anti-pollution, low cost and quick response. Therefore, the electro-hydraulic proportional valve is widely used in industrial production, for example, a ceramic floor tile adobe pressing machine, a strip steel constant tension control with a strip mill, a pressure vessel fatigue life testing machine, a hydraulic lift motion and control system, a metal-cutting machine tool workbench motion and control, a rolling mill pressure and control system, a hydraulic punching machine, a pipe bending machine, a plastic injection molding machine and the like.

In a proportional control system, the electro-hydraulic proportional valve not only serves as an electro-hydraulic conversion element, but also serves as a power amplifier element. The electro-hydraulic proportional valve plays an important role in the performance of the proportional control system, serving as a core element of the proportional control system.

The most remarkable feature and the most successful point of the electro-hydraulic proportional valve reside in using the proportional electromagnet as the electro-mechanical converter. Compared with a moving-coil type torque motor and a moving-iron type torque motor, the proportional electromagnet is simple and reliable in structure, good in manufacturability, convenient for use and maintenance, and can output larger force and displacement. In addition to being used for driving a priority valve, the proportional electromagnet also can be used for directly driving a low-powered output stage. For example, a direct-acting proportional valve, which controls a position of the valve core according to a principle that a thrust of the electromagnet is balanced with a spring force, is only applicable to small flow, and the maximum work flow in practical application generally is below 15 L/min (the maximum working pressure is 21 MPa). In addition, in order to achieve a balance of an axial static pressure, the direct-acting proportional directional valve or a flow valve uses a slide valve structure, which may easily be affected by a friction force or oil liquid pollution, thereby causing a clamping stagnation.

A positioning stiffness and a control accuracy of the valve core may be improved to a large extent by using a linear variable differential transformer (LVDT) to conduct a measurement and a closed-loop control of the position of the valve core to constitute an electro-feedback-type direct-acting proportional valve. Meanwhile, a great deal of theoretical study is conducted in terms of model, nonlinearity and system application. Finally, the electro-feedback-type direct-acting proportional valve may be applied, just like a servo valve, to a closed-loop control of a hydraulic system. However, due to magnetic saturation limit, the proportional electromagnet has a limited output force, and thus being unable to fundamentally solve the problem of impact of hydrodynamic force under a high pressure and a large flow, and still having flow saturation in a working condition of a high pressure (large differential pressure) and a large flow.

In order to eliminate the impact of the hydrodynamic force and improve a flow capacity of a hydraulic valve, the most fundamental method is to use a guidance and control (pilot control) technology. As early as 1936, Harry Vickers, an American engineer, invented a guidance and control overflow valve in order to solve a problem that due to impact of hydrodynamic force, a direct-acting overflow valve was unable to implement a pressure control of a high-pressure and large-flow system. The basic thought was as below: a smaller-sized pilot valve is used to control a static pressure, so as to drive a main valve core to move. Because the hydraulic thrust is much larger than a hydrodynamic force generated when oil fluid flows through a valve port, it is enough to eliminate an adverse impact on motion and control of the main valve core. This thought of guidance and control later is widely used in design of other hydraulic valves, so that a high-pressure and large-flow control of a hydraulic system comes true. Subsequently, various electro-hydraulic servo control elements also follow the design thought of pilot control, and the electro-hydraulic proportional valve is no exception, and takes over many structural principles of the servo valve.

SUMMARY OF THE INVENTION

In order to overcome the problem that an existing electro-hydraulic proportional valve is susceptible to friction force, hydrodynamic force and oil liquid pollution, thereby causing a clamping stagnation, and the problem that a guiding and controlling oil path losses pressure so that the whole valve is unable to work normally, and the problem that a guiding and controlling stage has a larger leakage flow, the present invention provides a pre-tensioning-pre-twisting full-bridge 2D electro-hydraulic proportional directional valve, which not only has advantages of large flow and high working pressure of an ordinary guiding and controlling electric-hydraulic proportional valve, but also implements a proportional control function at zero pressure (loss of pressure) like a direct-acting proportional valve.

The pre-tensioning-pre-twisting full-bridge 2D electro-hydraulic proportional directional valve in the present invention consists of a 2D valve, linear electro-mechanical converters 2 and 16 at two ends of the 2D valve, and a compression-torsion coupling positioned between the linear electro-mechanical converters 2 and 16, etc.

The pre-tensioning-pre-twisting full-bridge 2D electro-hydraulic proportional directional valve includes a 2D valve consisting of a valve core 9 and a valve body 8, where the valve core 9 is rotatably and axially sildably disposed inside an inner hole which is set along the axis line of the valve body 8, each of the left end and the right end of the valve core 9 each is provided with an end shoulder; the inner hole of the valve body between the end shoulders is successively provided with a T opening, an A opening, a P opening, a B opening and a T opening, where the P opening is a liquid inlet, a pressure of which is a system pressure; the valve core between the end shoulders is provided with two middle shoulders which are respectively positioned at the A opening and the B opening; and each of the shoulders is slidably in a seal fit with the inner hole of the valve body; wherein:

two ends of the 2D valve are respectively connected with linear electro-mechanical converters 2 and 16 by means of a compression-torsion coupling and cylindrical compression springs 23 and 21;

a left sensing cavity h at the left end and a right sensing cavity j at the right end are formed respectively among the end shoulders of the valve core 9, end covers 4 and 19 and the valve body 8;

each of the end shoulders of the valve core is provided with a pair of high pressure hole and low pressure hole, namely, a first high pressure hole b, a first low pressure hole d, a second high pressure hole c, and a second low pressure hole e; where the first high pressure hole b and the second high pressure hole c are through holes and are respectively communicated with the P opening through an inner hole k of the valve core; and the first low pressure hole d and the second low pressure hole e are respectively communicated with the T opening through a trench at an inner side of the end shoulders of the valve core;

a wall of the inner hole of each of two ends of the valve body is provided with a pair of axisymmetric sensing channels ($f_1$ and $f_2$, and $g_1$ and $g_2$), respectively communicated with a left sensing cavity h and a right sensing cavity j;

the pair of high pressure hole and low pressure hole is arranged at two sides of one of the sensing channels and is intersected with the respective sensing channel to form two channel openings, and is in series connection with the sensing channel to form hydraulic resistance half bridges; the pressure of the sensing cavities is respectively controlled by the hydraulic resistance half bridges at two ends;

the compression-torsion coupling consists of a sliding wedge 20, two rolling bearings 14 and 38 fixed respectively on two ends of a hinge pin 18 running through an end of the valve core, linear bearings 13 and 32 mounted on the sliding wedge, and pin bolts 10 and 22 for restricting the sliding wedge to rotate; a cylindrical compression cylindrical spring 21 is mounted between the valve body 8 and the sliding wedge 20, and the pre-compression amount of the cylindrical spring is slightly greater than a stroke of the valve core; the sliding wedge may be slidably sleeved, by means of the linear bearings 13 and 32, on the pin bolts 10 and 22 of an axial line parallel to the valve core; and the sliding wedge is provided with a first inclined plane and a second inclined plane respectively positioned at two sides of the axis line of the valve body; the first inclined plane and the second inclined plane are phase-inversion symmetric according to the axis line; the two rolling bearings respectively roll on the first inclined plane and the second inclined plane, so that the valve core twists while axially moving; the inclined planes of the sliding wedge at two ends mutually interwork so that a twist angle of the valve core has a definite corresponding relation with a position, of the valve core, along the axis line.

The inclined planes of the sliding wedges locating at the same side of the axial line press, respectively from an entry surface and a retreat surface along a direction of rotation of the valve core, the bearings locating at the same side of the axis line.

The compression-torsion coupling is a structure for implementation of converting a rectilinear motion of the linear electro-mechanical converters to a twisting motion of the valve core. In this process, a feature of a large pressure gain of a hydraulic guidance and control bridge circuit of the 2D valve (a micro rotation angle is enough to cause a larger change of pressure of the sensing cavities) may be taken full advantage of. By means of a reasonable design of the compression-torsion coupling, a twisting moment for driving the valve core to rotate is enlarged, so that an adverse impact of nonlinear factors, for example, a friction force between the valve core and a hole of the valve core, on proportional characteristic may be minimized.

An electromagnetic thrust outputted by the linear electro-mechanical converters drives, by means of the compression-torsion coupling, the valve core to rotate, which changes the pressure of the sensing cavities of the valve, thereby driving an axial movement of the valve core. In the moving process, the valve core rotates reversely, so that the pressure of its sensing cavities is gradually restored to the original value, and the valve core reaches a new balance position. A displacement of the valve core is directly proportional to the force of the proportional electromagnet.

The present invention has beneficial effects as below: 1. in allusion to a problem that the proportional electromagnet has limited magnetic saturation output thrust, a compression-twist enlargement driving technology is put forward, so that the driving force applied by the proportional electromagnet to the valve core is enlarged, and an adverse impact of nonlinear factors, for example, a friction force between the valve core and a hole of the valve core, on proportional characteristic is effectively eliminated; 2. two degree-of-freedom motions (rotation and sliding) of the valve core implements the function of a guidance and control electric-hydraulic proportional (throttling) valve, the valve core rotates so that an output pressure of a hydraulic resistance bridge is changed, and a static pressure is generated to drive the axial motion of the valve core, an adverse impact caused by the hydrodynamic force (Bernoulli force) is effectively overcome under high pressure and large flow, and the accuracy of axial positioning (main valve opening) of the valve core is effectively improved; 3. the 2D proportional (throttling) valve, the compression-torsion coupling and the proportional electromagnet are coaxially connected to constitute a 2D electric-hydraulic proportional (throttling) valve characterized by a simple structure and an advanced principle, which not only has advantages of large flow and high working pressure of an ordinary guidance and control electric-hydraulic proportional valve, but also implements a proportional control function at zero pressure (loss of pressure) like the direct-acting proportional valve.

DETAILED DESCRIPTION OF THE EMBODIMENTS

The following will further describe the present invention by reference to the accompanying drawings.

Referring to FIGS. 1~10, a pre-tensioning-pre-twisting full-bridge 2D electro-hydraulic proportional directional valve includes bolts 1, 3, 12, 30 and 33, linear electro-mechanical converters 2 and 16, end covers 4 and 19, linear bearings 5, 13, 31 and 32, cylindrical compression springs 21 and 23, O-shaped sealing rings 6, 11, 15 and 29, pin bolts 7, 10, 22 and 24, a valve body 8, a valve core 9, rolling bearings 14, 27, 36 and 38, top covers 17 and 28, hinge pins 18 and 26, sliding wedges 20 and 25, a set screw 34, a steel ball 35, and sleeves 37 and 39.

Figure 1:
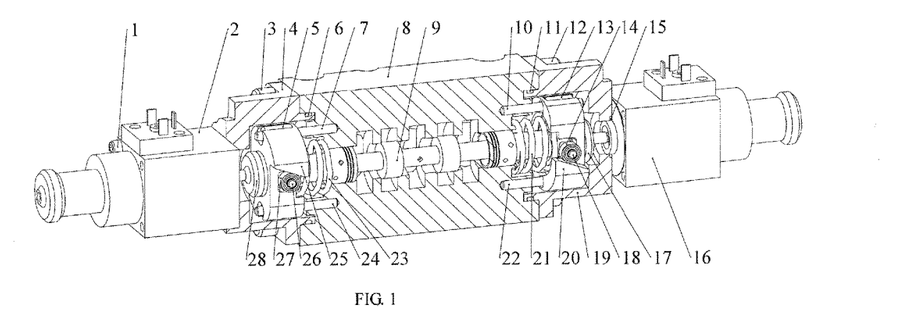
FIG. 1 is a schematic structural diagram of the invention.

The pre-tensioning-pre-twisting full-bridge 2D electro-hydraulic proportional directional valve consists of a 2D valve, linear electro-mechanical converters 2 and 16 at two ends of the 2D valve, and a compression-torsion coupling positioned between the linear electro-mechanical converters 2 and 16, etc.

Figure 2:
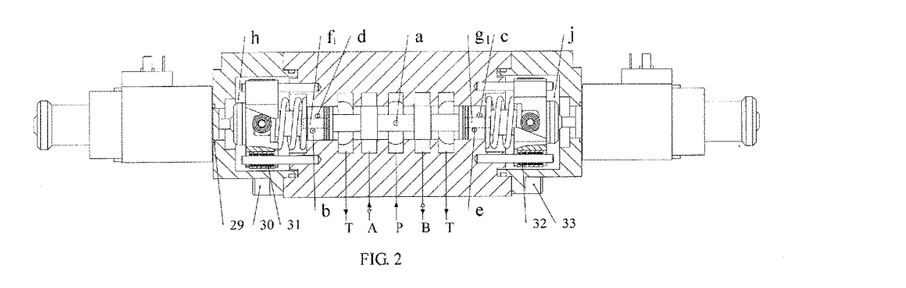
FIG. 2 is a schematic assembly diagram of the valve core and the valve body of the invention.
Figure 3:
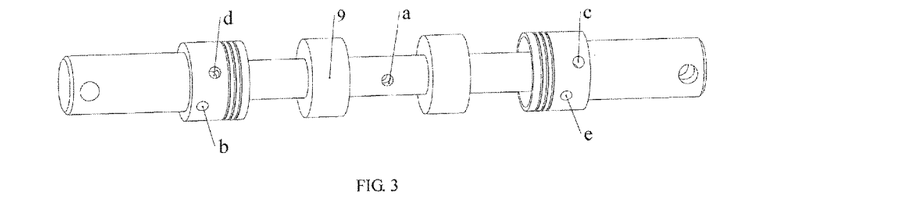
FIG. 3 is a schematic structural diagram of the valve core.
Figure 4:
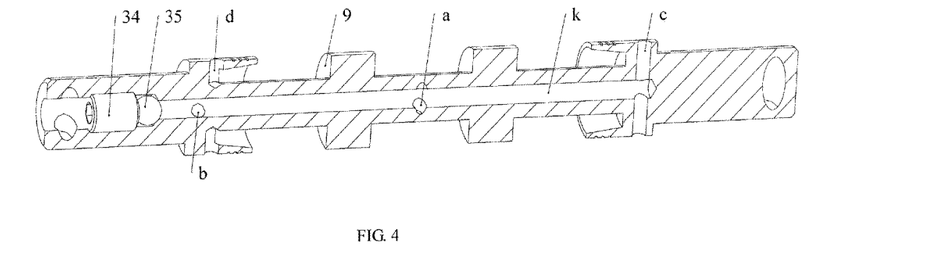
FIG. 4 is a section view of an internal structure of the valve core.
Figure 5:
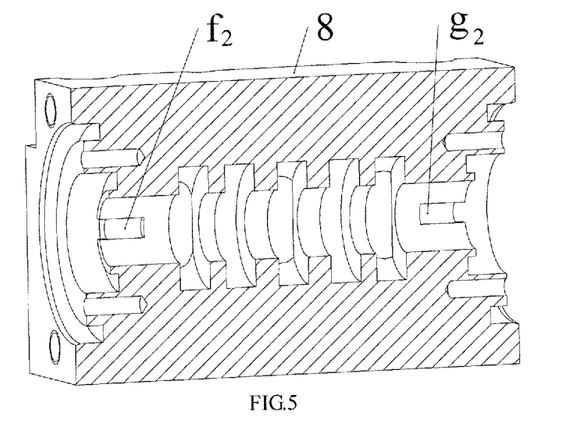
FIG. 5 is a section view of the valve body.
Figure 6:
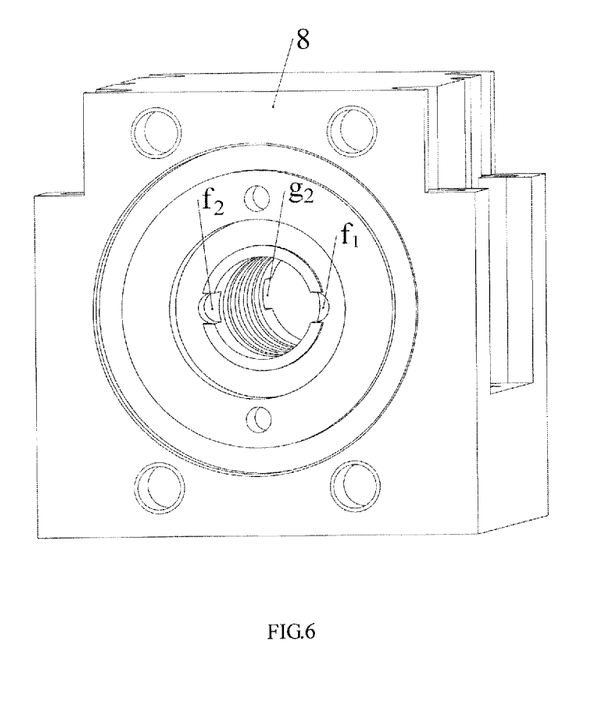
FIG. 6 is a schematic lateral view of the valve body.
Figure 7:
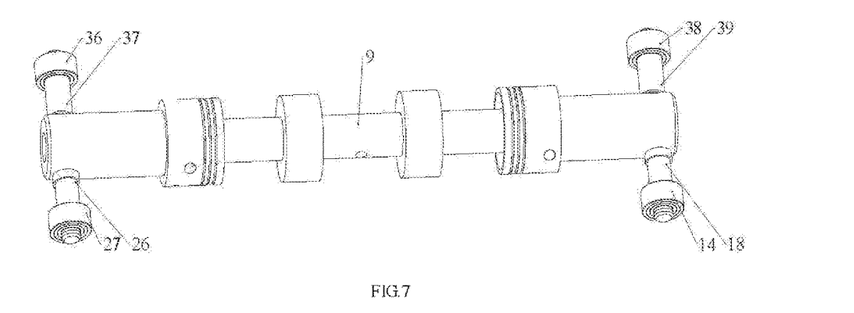
FIG. 7 is a schematic assembly diagram of the valve core and the rolling bearings.
Figure 9:
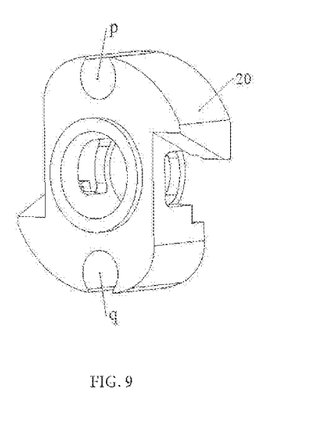
FIG. 9 is a schematic structural diagram of an outside surface of the sliding wedge.
Figure 10:
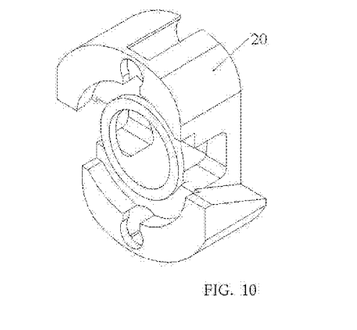
FIG. 10 is a schematic structural diagram of an inside surface of the sliding wedge.
Figure 11:
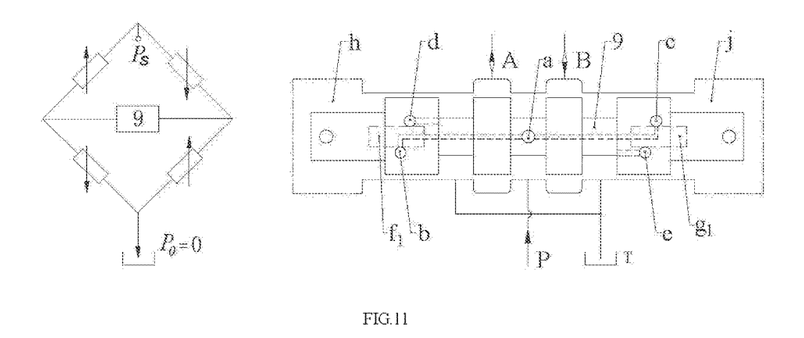
FIG. 11 is a schematic diagram of a hydraulic guidance and control full bridge.

The pre-tensioning-pre-twisting full-bridge 2D electro-hydraulic proportional directional valve includes the 2D valve consisting of the valve core 9 and the valve body 8, where the valve core 9 is rotatably and axially slidably disposed inside an inner hole which is set along the axis line of the valve body 8, each of the left end and the right end of the valve core 9 is provided with an end shoulder; the inner hole of the valve body between the end shoulders is successively provided with a T opening, an A opening, a P opening, a B opening and a T opening; the p opening is a liquid inlet, a pressure of which is a system pressure; the valve core between the end shoulders is provided with two middle shoulders which are respectively positioned at the A opening and the B opening; and each of the shoulders is slidably in a seal fit with the inner hole of the valve body 8; wherein:

two ends of the 2D valve are respectively connected with linear electro-mechanical converters 2 and 16 by means of a compression-torsion coupling and cylindrical compression springs 23 and 21;

a left sensing cavity h at the left end and a right sensing cavity j at the right end are formed respectively among the end shoulders of the valve core, the end covers 4 and 19 and the valve body 8;

as shown in FIG. 3 and FIG. 4, each of the end shoulders of the valve core is provided with a pair of high pressure hole and low pressure hole, namely, a first high pressure hole b, a first low pressure hole d, a second high pressure hole c, and a second low pressure hole e; where the first high pressure hole b and the second high pressure hole c are through holes and are respectively communicated with the P opening through a hole a and an inner hole k of the valve core; and the first low pressure hole d and the second low pressure hole e are respectively communicated with the T opening through a trench at an inner side of the end shoulders of the valve core; and the number of the first high pressure hole b and the second high pressure hole c on the end shoulder of the valve core is two, which are mutually and axisymmetrically distributed; the number of the first low pressure hole d and the second low pressure hole e on the end shoulder of the valve core is two, which are mutually and axisymmetrically distributed. As shown in FIG. 5 FIG. 6, a wall of the inner hole of each of two ends of the valve body is provided with a pair of axisymmetrical sensing channels ($f_1$ and $f_2$, and $g_1$ and $g_2$), respectively communicated with the left sensing cavity h and the right sensing cavity j; as shown in FIG. 11, the a pair of high pressure hole and low pressure hole is arranged at two sides of one of the sensing channels and is intersected with the respective sensing channel to form two channel openings, and is in series connection with the sensing channel to form hydraulic resistance half bridges; the pressure of the sensing cavities is respectively controlled by the hydraulic resistance half bridges at two ends;

the compression-torsion coupling consists of the sliding wedge 20, two rolling bearings 14 and 38 fixed respectively on two ends of the hinge pin 18 running through an end of the valve core, the linear bearings 13 and 32 mounted in holes p and q of the sliding wedge, and the pin bolts 10 and 22 for restricting the sliding wedge to rotate; the cylindrical compression spring 21 is mounted between the valve body and the sliding wedge, and a pre-compression amount of the spring is slightly greater than a stroke of the valve core; the sliding wedge may be slidably sleeved, by means of the linear bearings, on the pin bolts of an axial line parallel to the valve core; and the sliding wedge is provided with a first inclined plane and a second inclined plane respectively positioned at two sides of the axis line of the valve body; the first inclined plane and the second inclined plane are phase-inversion symmetric according to the axis line; the two rolling bearings respectively roll on the first inclined plane and the second inclined plane, so that the valve core twists while axially moving; the inclined planes of the sliding wedge at two ends mutually interwork so that a twist angle of the valve core has a definite corresponding relation with a position, of the valve core, along the axis line.

The inclined planes of the sliding wedge positioned at two ends of the same side of the axis line press, respectively from an entry surface and a retreat surface along a direction of rotation of the valve core, the bearing of the same side at two ends of the valve core.

The compression-torsion coupling is a structure for implementation of converting a rectilinear motion of the linear electro-mechanical converters to a twisting motion of the valve core. In this process, a feature of a large pressure gain of a hydraulic guidance and control bridge circuit of the 2D valve (a micro rotation angle is enough to cause a larger change of pressure of the sensing cavities) may be taken full advantage of. By means of a reasonable design of the compression-torsion coupling, a twisting moment for driving the valve core to rotate is enlarged, so that an adverse impact of nonlinear factors, for example, a friction force between the valve core and a hole of the valve core, on proportional characteristic may be minimized.

Figure 8:
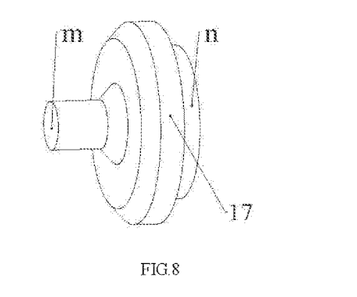
FIG. 8 is a schematic structural diagram of a top cover.

The O-shaped sealing rings 6 and 11 are used for sealing between the end covers and the valve body; the O-shaped sealing rings 15 and 29 are used for sealing between the end covers and linear electro-mechanical converters; a large cylindrical end n of the top covers 17 and 28 is in an interference fit connection with the inner holes in the center of the sliding wedges 20 and 25; force outputted by a push rod of the linear electro-mechanical converters is applied to a small cylindrical end m of the top covers, and is axially transferred to the sliding wedges. The linear bearings 5 and 31 and the linear bearings 13 and 32 are respectively symmetrically mounted in the upper hole p and the lower hole q of the sliding wedge, so as to reduce the friction force of the sliding wedge sliding on the pin bolts; the set screw 34 bears the steel ball 35 against one end surface of the inner hole k of the valve core to seal one end of the inner hole k of the valve core; one end of the sleeves 37 and 39 bears against the valve core, and the other end bears against an inner ring of the rolling bearings 36 and 38, to act as a support bearing.

The high pressure hole and the low pressure hole are shaped like a circle. A rectangular window having a large-area gradient may be used if it is required that an axial motion of the valve core has quick response to a rotational motion.

The linear electro-mechanical converters are wet-type high voltage resistant proportional electromagnets, or other wet-type high voltage resistant linear electro-mechanical converters may be selected and used.

Figure 12:
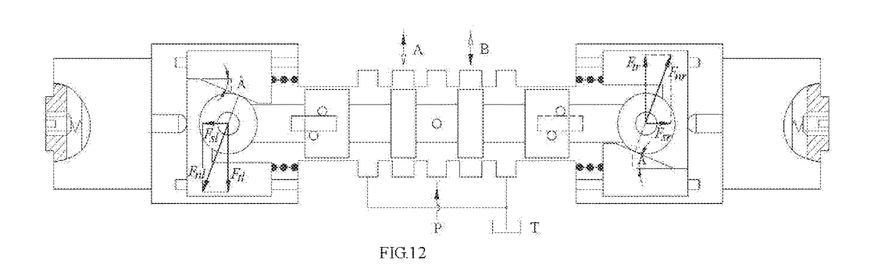
FIGS. 12~14 are force analysis and motion process diagrams of the invention.

The working principle of this embodiment: As shown in FIG. 12, when the proportional electromagnets at two ends of the 2D electro-hydraulic proportional valve is not energized, outward thrust $F_S$ applied by the springs to the sliding wedges (a left end and a right end are respectively represented with "l" and "r") is transferred, by means of two axisymmetrical inclined planes of the sliding wedges and a contact position of the two rolling bearings, to the valve core. Due to effect of the inclined planes, in addition to bearing an axial tension $F_S$, the valve core also bears a tangential force $F_t$, two tangential forces of two contact positions at the same end are equal in size, and opposite in direction, and constitute a force couple. The axial force and the force couple applied by the sliding wedges at two ends to the valve core are opposite in direction. Therefore, the valve core is in a pre-tensioning and pre-twisting state when it is in a balance position. When the proportional electromagnets at a certain end of the 2D electro-hydraulic proportional valve is energized, thrust $F_m$ applied to the sliding wedges not only makes the axial force of the valve core out of balance, but also makes the twisting moment applied to the valve core out of balance, so that the valve core rotates.

Figure 13:
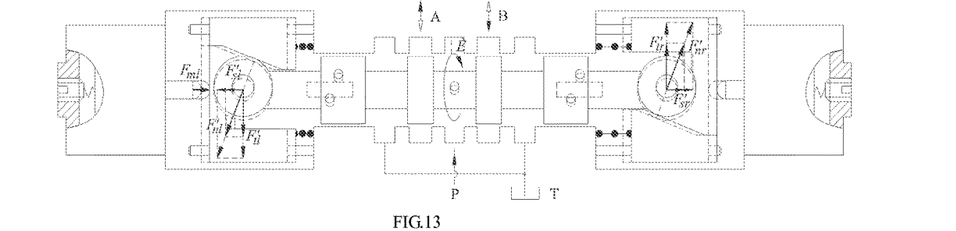
Figure 14:
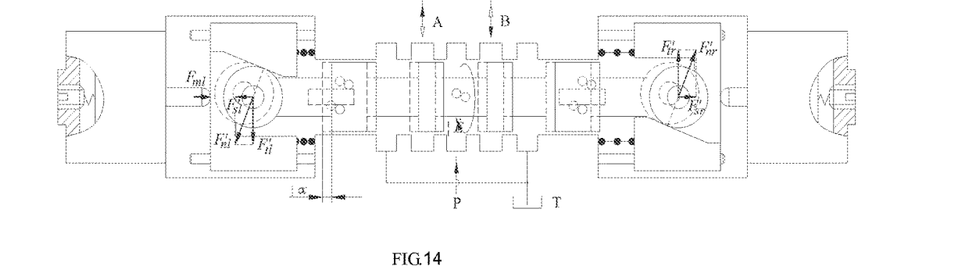

For example, when the proportional electromagnet at the left end is energized, a rightward electromagnetic thrust $F_{ml}$ is generated, so that force applied by the sliding wedge at the left end to the valve core is reduced, both axial force and twisting moment applied to two ends of the valve core are out of balance, and the valve core is subjected to a rightward axial driving force and a counterclockwise twisting moment (seen from left to right). The axial driving force is equivalent to a driving force of a direct-acting proportional valve. In a working condition characterized by high pressure and large flow, an axial motion of the valve core may be unable to be directly driven due to existence of hydrodynamic force and friction force. However, by reasonably selecting a smaller angle β of the inclined plane of the sliding wedge and a larger distribution diameter of the rolling bearing, a larger tangential force may be obtained, so that the friction force of the valve core may be overcome enough to drive the valve core to counterclockwise rotate. Meanwhile, due to axial constraint of pin bolts, the sliding wedges at two ends may slide rightwards by taking the pin bolts as a guidance axis and taking the linear bearings as a supporting. A compression amount of the right-end spring is reduced; while a compression amount of the left-end spring is increased, so as to generate an extra spring force to balance the thrust of the proportional electromagnet (see FIG. 13). In this process, because the valve core counterclockwise rotates, a pressure of the left sensing cavity of the valve rises, while a pressure of the right sensing cavity decreases, and the valve core moves rightwards. In the motion process, because the rolling bearings at two ends of the valve core are restrained by the inclined planes of the sliding wedges at two ends, the valve core also rotates back (clockwise rotates) when it is moving rightwards, the pressure of the sensing cavities at two ends of the valve core restores to a steady-state balance value, and the valve core reaches a new balance position corresponding to the size the thrust of the proportional electromagnet (see FIG. 14). It is particularly to be pointed out that, when the pressure of the P opening of the valve is zero (equal to the pressure of the T opening), it is unable to drive a shaft of the valve core to move by means of change of the pressure of the sensing cavities at two ends. However, because no oil and fluid flows in a valve chamber, the valve core is not subjected to a hydrodynamic force or a clamping force. Therefore, an axial thrust generated by the proportional electromagnet after it is energized may directly drive the valve core to move. Under this condition, the working principle of the 2D electro-hydraulic proportional valve is the same as that of the direct-acting proportional valve.

The embodiments described above are intended for explaining the present invention, and are not intended to limit the present invention. Any modification or alteration made within the spirit of the present invention and the protection scope of claims shall fall within the protection scope of the present invention.

The invention claimed is:

1. A pre-tensioning-pre-twisting full-bridge electro-hydraulic proportional directional valve, comprising a valve consisting of a valve core and a valve body, wherein the valve core is rotatably and axially slidably disposed inside an inner hole that is set along an axis line of the valve body, each of a left end and a right end of the valve core is provided with an end shoulder; the inner hole of the valve body between the end shoulders is successively provided with a first opening, a second opening, a third opening, a fourth opening, and a fifth opening; the third opening is a liquid inlet, a pressure of which is a system pressure; the valve core between the end shoulders is provided with two middle shoulders that are respectively positioned at the second opening and the fourth opening; and each of the shoulders is slidably in a seal fit with the inner hole of the valve body; wherein:

two ends of the valve are respectively connected with linear electro-mechanical converters by means of a compression-torsion coupling and cylindrical compression springs;

a left sensing cavity at the left end and a right sensing cavity at the right end are formed respectively among the end shoulders of the valve core, a plurality of end covers, and the valve body;

each of the end shoulders of the valve core is provided with a pair of high pressure holes and low pressure holes, namely, a first high pressure hole (b), a first low pressure hole (d), a second high pressure hole (c), and a second low pressure hole (e); wherein the first high pressure hole (b) and the second high pressure hole (c) are respectively communicated with the third opening through an inner hole of the valve core; and the first low pressure hole (d) and the second low pressure hole (e) are respectively communicated with the first and fifth openings through a trench at an inner side of the end shoulders of the valve core;

a wall of the inner hole of each of the two ends of the valve body is provided with a pair of axisymmetric sensing channels ($f_1$ and $f_2$, and $g_1$ and $g_2$), respectively communicated with the left sensing cavity and the right sensing cavity;

both of the pairs of high pressure holes and low pressure holes are arranged at two sides of one of the sensing channels, are intersected with the respective sensing channel to form two channel openings, and are in series connection with the sensing channel to form hydraulic resistance half bridges; the pressure of the left and right sensing cavities is respectively controlled by the hydraulic resistance half bridges at two ends;

the compression-torsion coupling consists of a sliding wedge, two rolling bearings fixed respectively on two ends of a hinge pin running through an end of the valve core, a linear bearing mounted on the sliding wedge, and a pin bolt for restricting the sliding wedge to rotate; the cylindrical spring is mounted between the valve body and the sliding wedge, and a pre-compression amount of the cylindrical spring is slightly greater than the stroke of the valve core; the sliding wedge is slidably sleeved, by means of the linear bearing, on the pin bolt of an axial line parallel to the valve core;

the sliding wedge is provided with a first inclined plane and a second inclined plane respectively positioned at two sides of the axis line of the valve body; the first inclined plane and the second inclined plane are phase-inversion symmetric according to the axis line; the two rolling bearings respectively roll on the first inclined plane and the second inclined plane, so that the valve core twists while axially moving; the inclined planes of the sliding wedge at two ends mutually interwork so that a twist angle of the valve core has a definite corresponding relation with a position of the valve core along the axis line; and the valve includes two movements comprising a linear movement and a rotation movement based on the valve core being disposed rotatably and axially slidably inside the inner hole of the valve body.

2. The proportional directional valve according to claim 1, wherein, the inclined planes of the sliding wedges located at the same side of the axis line press, respectively from an entry surface and a retreat surface along a direction of rotation of the valve core, the bearings located at the same side of the axis line.

3. The proportional directional valve according to claim 2, wherein the number of the first high pressure hole (b) and the second high pressure hole (c) on the end shoulder of the valve core is two, which are mutually and axisymmetrically distributed; the number of the first low pressure hole (d) and the second low pressure hole (e) on the end shoulder of the valve core is two, which are mutually and axisymmetrically distributed; and the first high pressure hole (b) and the second high pressure hole (c) are through holes, and are respectively communicated with the third opening through the inner hole of the valve core.

4. The proportional directional valve according to claim 3, wherein the high pressure holes and the low pressure holes adopt a rectangular window.

5. The proportional directional valve according to claim 1, wherein the number of the first high pressure hole (b) and the second high pressure hole (c) on the end shoulder of the valve core is two, which are mutually and axisymmetrically distributed; the number of the first low pressure hole (d) and the second low pressure hole (e) on the end shoulder of the valve core is two, which are mutually and axisymmetrically distributed; and the first high pressure hole (b) and the second high pressure hole (c) are through holes, and are respectively communicated with the third opening through the inner hole of the valve core.

6. The proportional directional valve according to claim 5, wherein the high pressure holes and the low pressure holes adopt a rectangular window.

* * * * *